United States Patent
Reeves et al.

(10) Patent No.: US 9,185,514 B1
(45) Date of Patent: Nov. 10, 2015

(54) ORCHESTRATION OF APPLICATION UPDATES OVER A WIRELESS COMMUNICATION NETWORK

(71) Applicant: Sprint Communications Company L.P., Overland Park, KS (US)

(72) Inventors: Raymond Emilio Reeves, Oviedo, FL (US); Tania S. Mazza, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 204 days.

(21) Appl. No.: 14/050,454

(22) Filed: Oct. 10, 2013

(51) Int. Cl.
*H04W 8/22* (2009.01)
*H04W 4/00* (2009.01)

(52) U.S. Cl.
CPC ..................... *H04W 4/003* (2013.01)

(58) Field of Classification Search
CPC ........................................ H04W 8/22
USPC ................................. 455/418, 419
See application file for complete search history.

(56) References Cited

U.S. PATENT DOCUMENTS

| | | | |
|---|---|---|---|
| 7,620,392 B1 * | 11/2009 | Maurya et al. | 455/418 |
| 8,351,934 B1 * | 1/2013 | Schmitt et al. | 455/433 |
| 8,554,196 B2 * | 10/2013 | Kruglick | 455/422.1 |
| 8,646,061 B2 * | 2/2014 | Oh et al. | 726/10 |
| 8,819,658 B2 * | 8/2014 | Balasubramanian | 717/168 |
| 2001/0029178 A1 * | 10/2001 | Criss et al. | 455/419 |
| 2006/0236083 A1 * | 10/2006 | Fritsch et al. | 713/1 |
| 2010/0233996 A1 * | 9/2010 | Herz et al. | 455/411 |
| 2012/0214527 A1 | 8/2012 | Meylan et al. | |
| 2012/0260118 A1 | 10/2012 | Jiang et al. | |
| 2013/0052965 A1 | 2/2013 | Meylan et al. | |
| 2013/0053013 A1 | 2/2013 | Giaretta et al. | |
| 2014/0082147 A1 * | 3/2014 | Pazos et al. | 709/219 |

* cited by examiner

*Primary Examiner* — Christopher M Brandt

(57) ABSTRACT

Embodiments disclosed herein provide systems and methods for orchestrating application updates over a wireless communication network. In a particular embodiment, a method provides registering a first application with an update controller and, in response to registering the first application, determining first network data update parameters for the first application and determining network constraints on application data updates over a wireless communication network. The method further provides determining when the first application is allowed to request data updates based on the first network data update parameters and the network constraints and notifying the first application of when the first application is allowed to request data updates over the wireless communication network.

20 Claims, 8 Drawing Sheets

| UPDATE SCHEDULE 501 | |
|---|---|
| APP | TIME |
| EMAIL 321 | T1 |
| SOCIAL 322 | T1 |
| NEWS 323 | T2 |
| WEATHER 324 | T2 |
| CALENDAR 325 | T3 |

| UPDATE SCHEDULE 502 | |
|---|---|
| APP | TIME |
| EMAIL 321 | 5 MIN |
| SOCIAL 322 | 5 MIN |
| NEWS 323 | 15 MIN |
| WEATHER 324 | 15 MIN |
| CALENDAR 325 | 60 MIN |

FIGURE 5

ORCHESTRATION OF APPLICATION UPDATES OVER A WIRELESS COMMUNICATION NETWORK

TECHNICAL BACKGROUND

Wireless communication devices are now able to install and run numerous applications. Many of the applications can instruct wireless devices to request and receive data updates over a wireless communication network. These data updates may include messages, news items, current weather information, documents, or any other type of data that may be used by an application. These data updates may occur at any time, including times when an application is executing in the background or when a device is otherwise dormant.

As more applications that request such data updates execute on a wireless device, more resources of both the device and the wireless network are used in order to provide each application with a data channel necessary to request and receive updates. Since each application on a device updates on its own accord, the device may be constantly requesting data resources from the wireless network in order to provide each individual application with a channel to request updates.

Overview

Embodiments disclosed herein provide systems and methods for orchestrating application updates over a wireless communication network. In a particular embodiment, a method provides registering a first application with an update controller and, in response to registering the first application, determining first network data update parameters for the first application and determining network constraints on application data updates over a wireless communication network. The method further provides determining when the first application is allowed to request data updates based on the first network data update parameters and the network constraints and notifying the first application of when the first application is allowed to request data updates over the wireless communication network.

BRIEF DESCRIPTION OF THE DRAWINGS

FIG. 5 illustrates an exemplary update schedule for orchestrating application updates over a wireless communication network.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
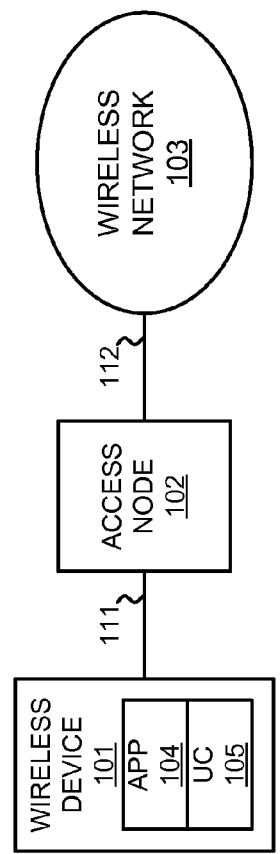
FIG. 1 illustrates a wireless communication system for orchestrating application updates over a wireless communication network.

FIG. 1 illustrates wireless communication system 100. Wireless communication system 100 includes wireless communication device 101, wireless access node 102, and wireless communication network 103. Wireless communication device 101 and wireless access node 102 communicate over wireless link 111. Wireless access node 102 and wireless communication network 103 communicate over communication link 112.

In operation, wireless communication device 101 executes application 104. Wireless communication device 101 may execute other applications as well but only application 104 will be discussed for clarity. Application 104 is an application that is configured to request and receive data updates from over wireless network 103. For example, application 104 may be an email application that queries an email server over wireless network 103. Thus, application 104 may be configured to periodically transfer requests for new emails (i.e. data updates) to the email server, which in turn transfers any new email messages to application 104 in response to the request.

While a single application 104 requesting periodic data updates would likely not have much of an effect on the resources of wireless device 101 and wireless network 103 (e.g. battery and wireless bandwidth), as wireless device 101 executes more applications that request data updates, more resources will be required to service those updates. Without coordinating these updates, resources of wireless device 101 and wireless network 103 are likely not used as efficiently as the resources otherwise could be used. For example, multiple applications may all request data updates a different times thereby requiring wireless device 101 to obtain a traffic channel on access node 102 for each of those times, whereas coordinating those updates to occur contemporaneously would allow for a single traffic channel request for multiple applications to request data updates.

Figure 2:
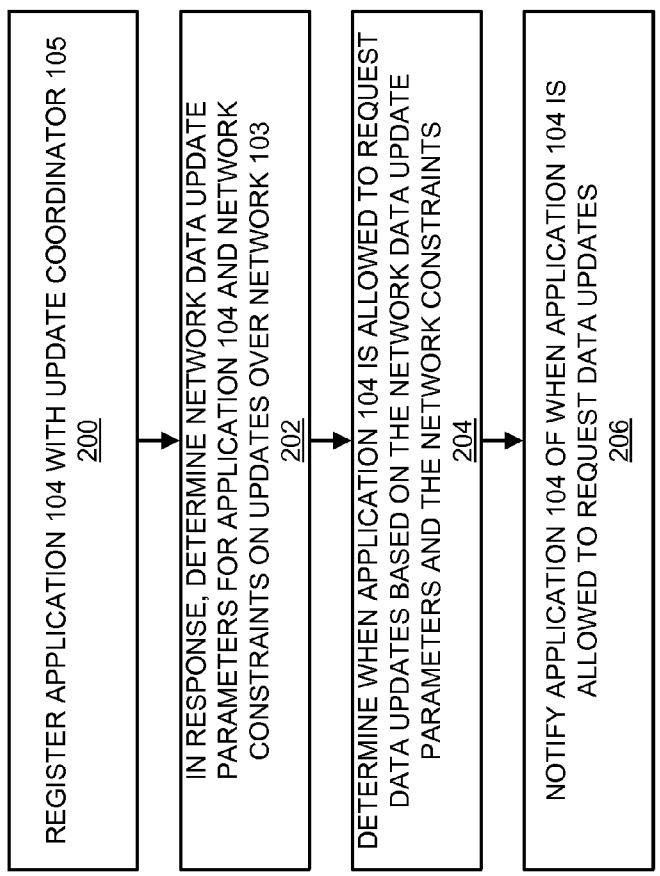
FIG. 2 illustrates an operation of the wireless communication system to orchestrate application updates over a wireless communication network.

FIG. 2 illustrates an operation of wireless communication system 100 to orchestrate application updates over a wireless communication network. Application 104 is registered with update controller 105 in wireless communication device 101 (step 200). Update controller 105 may be another application executing on wireless device 101, an element of an operating system for wireless device 101, a independent hardware element of wireless device 101 (e.g. an application specific integrated circuit), a hardware component integrated into another hardware element of wireless device 101 (e.g. within the wireless communication interface of wireless device 101), or some software or hardware component—including combinations thereof. Application 104 may be registered upon being installed on wireless device 101, upon being opened for the first time, each time application 104 is opened, or at some other time before application 104 requests data updates.

In response to registering application 104, update controller 105 determines network data update parameters for application 104 and determines network constraints on application data updates over wireless network 103 (step 202). The network data update parameters for application 104 may be received from application 104 as part of the registration process of application 104 in step 200, update controller 105 may query application 104 for the network data update parameters, update controller 105 may query a system (e.g. an application server) over wireless network 103 for the network data update parameters, or any other way in which information may be received by a module of a wireless device—including combinations thereof. The network data update parameters may indicate a frequency in which application 104 should request data updates, a frequency in which a user of application 104 would like to receive data updates, an amount of data that is typically exchanged when application 104 updates, what type of data is exchanged when application 104 updates, or any other information that may be relevant to data update activities of application 104—including combinations thereof.

Update controller 105 may receive the network constraints from wireless network 103 periodically, may request the network constraints upon each application registration, the network constraints may be preloaded into update controller 105, or any other way in which update controller 105 may receive information from wireless network 103—including combinations thereof. The network constraints may indicate how often (or time periods when) a particular application or application type should be allowed to update, how often (or time periods when) any of the applications on wireless device 101 are allowed to update, times when wireless network 103 can best handle updates (e.g. peak and off-peak times), or any other information that may be relevant to data update activities of applications executing on wireless device 101—including combinations thereof.

Update controller 105 determines when application 104 is allowed to request data updates based on the network data update parameters and the network constraints (step 204). For example, update controller 105 may determine when application 104 should update by determining an update time(s) that satisfy both the network data update parameters and the network constraints. Alternatively, if no time(s) satisfy both the network data update parameters and the network constraints, then update controller 105 may choose a time(s) that best fits the parameters and the constraints. Update controller 105 may be configured to weigh the best fit to better fit the parameters or to better fit the constraints. Update controller 105 may consider the network data update parameters and network constraints in other ways than those mentioned above. Likewise, update controller 105 may consider other factors when determining when application 104 is allowed to request data updates. For example, update controller 105 may also consider network data update parameters for other applications registered with update controller 105.

After determining when application 104 is allowed to request data updates, update controller 105 notifies application 104 of when application 104 is allowed to request data updates over wireless network 103 (step 206). Application 104 may be notified at each individual time that application 104 is allowed to update, may be notified with a schedule of when application 104 is allowed to update, or with some other means of notification—including combinations thereof. Upon being notified, application 104 may perform functions necessary to request data updates over wireless network 104 in accordance with the notification.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. Wireless access node 102 could be a base station, Internet access node, telephony service node, wireless data access point, or some other wireless communication system—including combinations thereof.

Communication network 103 comprises access node 102 and other network elements that provide communications services to wireless device 101 through wireless access node 102. Communication network 103 may comprise switches, wireless access nodes, Internet routers, network gateways, application servers, computer systems, communication links, or some other type of communication equipment—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
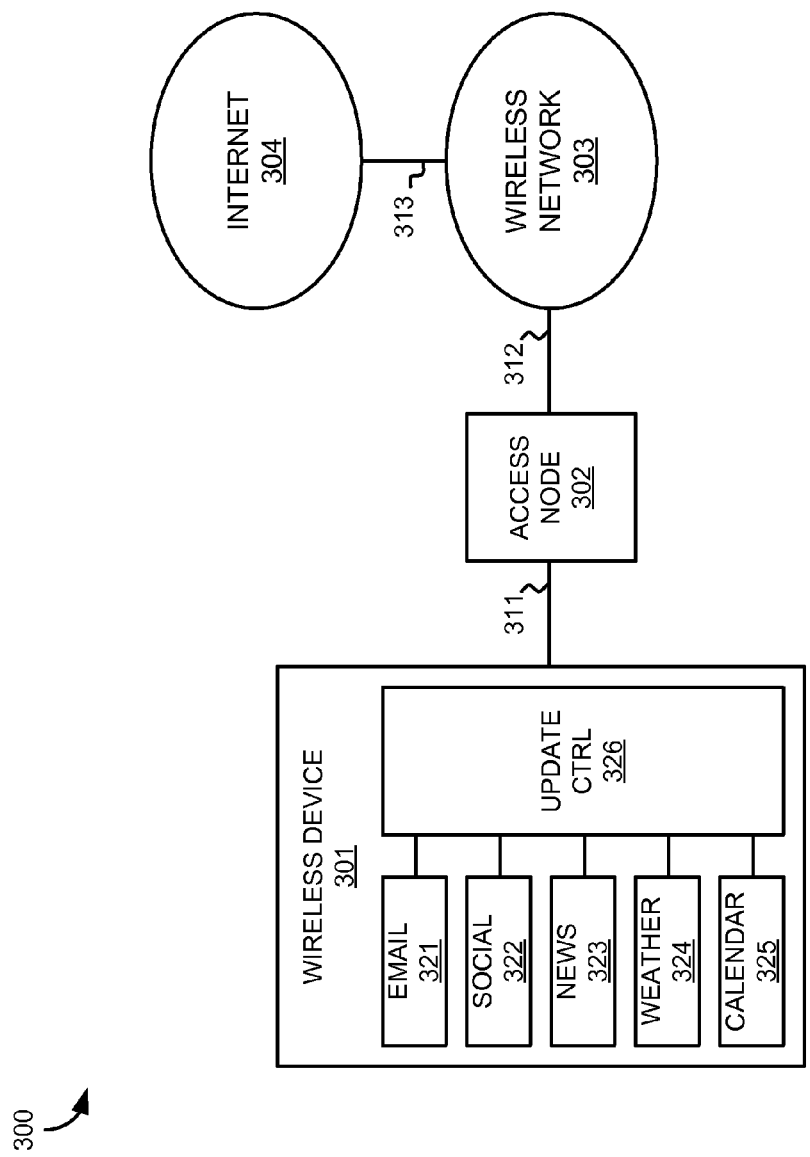
FIG. 3 illustrates a wireless communication system for orchestrating application updates over a wireless communication network.

FIG. 3 illustrates wireless communication system 300. Wireless communication system 300 includes wireless communication device 301, wireless access node 302, wireless communication network 303, and Internet 304. Wireless communication device 301 and wireless access node 302 communicate over wireless link 311. Wireless access node 302 and wireless communication network 303 communicate over communication link 312. Wireless communication network 303 and Internet 304 communicate over communication link 313.

In operation, applications 321-325 are installed and executing on wireless device 301. Applications 321-325 request data updates from systems on Internet 304 (or wireless network 303) even when operating in the background. Update controller 326 is a software element also executing on wireless device 301 and is able to control whether applications on wireless device 301 are able to request and receive data updates over wireless network 303. In some examples, update controller 326 is an element of the operating system of wireless device 301. Applications 321-325 interact with update controller 326 using an Application Programming Interface (API).

Figure 4:
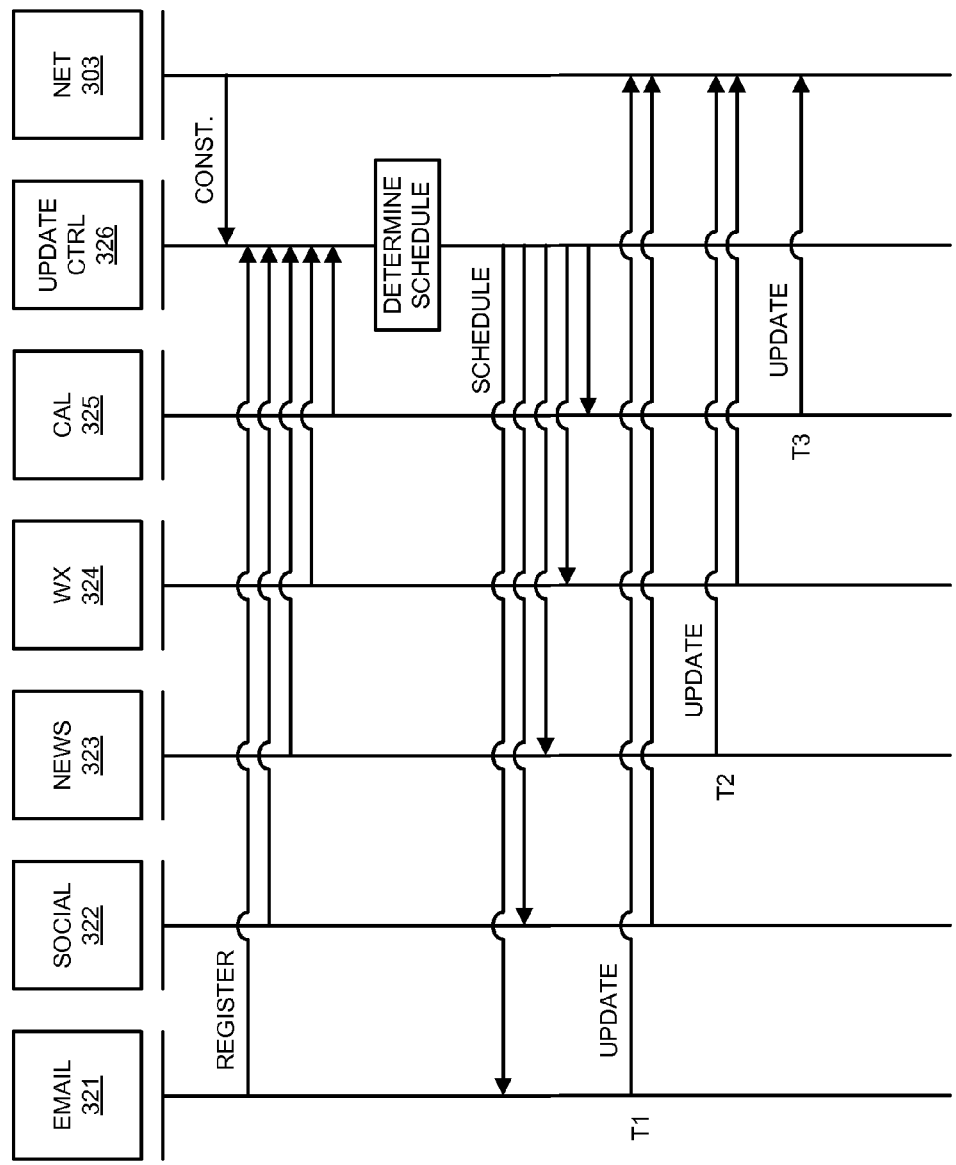
FIG. 4 illustrates an operation of the wireless communication system to orchestrate application updates over a wireless communication network.

FIG. 4 illustrates an operation of wireless communication system 300 to orchestrate application updates over a wireless communication network. Each of applications 321-325 uses the API for update controller 326 to register with update controller 326 so that update controller 326 will allow applications 321-325 to request and receive data updates from their respective update systems. Each of applications 321-325 may register every time the application is executed, only the first time the application is executed, when the application is installed onto wireless device 301, or at some other time that would be conducive for update controller 326 to coordinate data updates.

As part of the registration processes, each of applications 321-325 informs update controller 326 via the API about parameters, either required or preferred, for each application to request and receive data updates. The parameters may be preprogrammed into the application or may be selected by a user of wireless device 301. The parameters for an application may indicate a frequency of updates requested, a specific time(s) in which updates should occur, a priority of updates for the application relative to other applications, or any other information relevant to data updates for an application.

Update controller 326 also receives update constraints from wireless network 303 regarding any limitations or preferences that wireless network 303 may have on the data update requests from wireless device 301. The constraints may limit the frequency of data updates, specific time(s) in which updates should occur, amount of data that can be exchanged per update, or any other information relevant to data updates for applications on a wireless device. In some examples, the parameters may include limitations or preferences for a specific applications or application types.

After receiving parameters from applications 321-325 and from wireless network 303, update controller 326 determines a data update schedule for each of applications 321-325. The data update schedule indicates when each of applications 321-325 is allowed to update. When generating the data update schedule, update controller 326 determines update times for each application that satisfy both the application data update parameters and the network constraints. If update controller 321 is not able to satisfy both the parameters and constraints for all applications, update controller 321 may use a best fit method to determine an update time the application(s) whose parameters cannot be satisfied. In those situations, update controller 321 may consider application priority in order to determine which application should have its parameters better satisfied. For example, data updates for email application 321 may be given priority over data updates for social networking application 322. Likewise, when determining best fit, more weight may be given to the network constraints over the application parameters, or vice versa.

Once generated, update controller 326 transfers at least the portion of the schedule relevant to each of applications 321-325 to applications 321-325 (i.e. application 322 does not necessarily need to know the schedule for application 321). Once received by an application, the data update schedule may be in place indefinitely or may expire after a period of time so as to require update controller 326 to generate a new schedule periodically. As additional applications register with update controller 326, applications deregister or are otherwise no longer controlled by update controller 326 (i.e. have not run in a predetermined amount of time), new parameters are received from any one of applications 321-325, new constraints are received from network 303, or for some other reason, update controller 326 may generate a new data update schedule and transfer at least the relevant portions of the new data update schedule to applications 321-325.

FIG. 5 illustrates two examples of data update schedules that may be generated by update controller 326. Data update schedule 501 indicates that email application 321 and social networking 322 application should be updated at time T1, news application 323 and weather application 324 should be updated at time T2, and calendar application 325 should be updated at time T3. Times T1, T2, and T3 may have been selected because the times satisfy both the update frequency indicated by each application's update parameters and the times may also satisfy a data update window for wireless device 301 provided for in the network constraints.

Data update schedule 502 provides specific times that may be determined by update controller 326. Specifically, in this example, email application 321 and social networking application 322 should be updated every 5 minutes, news application 323 and weather application 324 should be updated every 15 minutes, and calendar application 325 should be updated every 60 minutes. Email application 321 and social networking application 322 may be updated more frequently because their respective parameters request updates every 5 minutes or 5 minutes is the best fit interval that update controller 326 determined would satisfy both parameters from applications 321-322 and network constraints 303. Furthermore, in this example, the update times may come in factors of 5 minutes (i.e. 5, 15, and 60) because the network constraints provide that wireless device 301 can request updates at particular 5 minute intervals. That is, the network constraints may provide that wireless device 301 can request updates at 3 minutes past the hour, 8 minutes past, 13 minutes past, etc. If wireless network 303 provides these constraints to a group of devices including wireless device 301 and provides different constraints to other device (e.g. 2, 7, 12, etc. minutes past), then wireless network 303 may be able to ease the chances that too many devices allow data update requests at the same time.

Referring back to FIG. 4, once each application 321-325 has received its respective data update schedule, each application 321-325 requests data updates over wireless network 303 at the time indicated by the data update schedule. Email application 321 and social networking application 322 request data updates at time T1, news application 323 and weather application 324 request data updates at time T2, and calendar application 325 requests data updates at time T3. It should be further understood that email and social applications 321-322 may also request data updates at time T2 and T3 as those times coincide with time T1 (e.g. every third data update at a 5 minute interval for applications 321-322 coincides with a 15 minute data update interval). Likewise, news and weather applications 323-324 may request data updates at time T3 as that time coincides with time T2.

Figure 6:
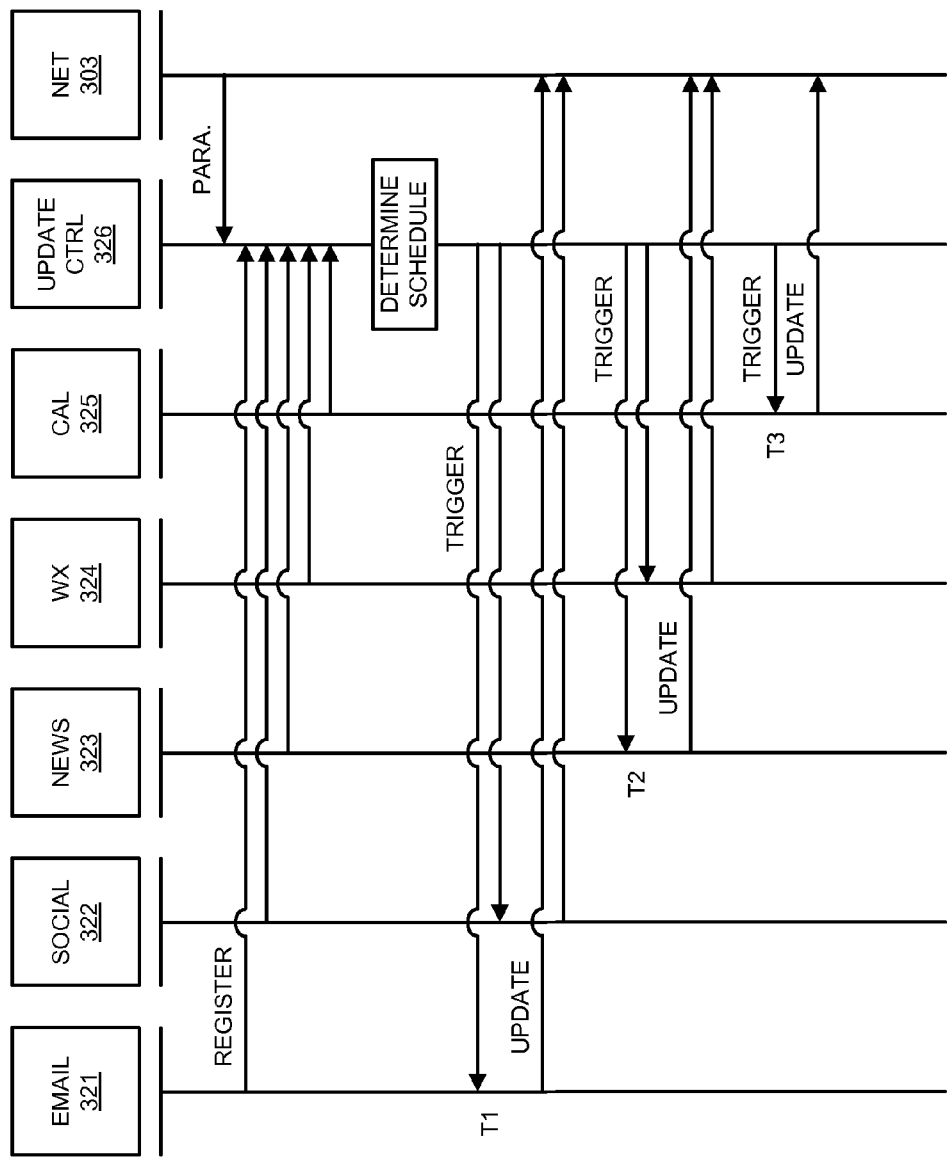
FIG. 6 illustrates an operation of the wireless communication system to orchestrate application updates over a wireless communication network.

FIG. 6 illustrates an operation of wireless communication system 300 to orchestrate application updates over a wireless communication network. In this example, applications 321-325 register with update controller 326 and update controller 326 determines a data update schedule based in the same manner described above with respect to FIG. 4. However, instead of transferring the schedule to applications 321-322 to control the data updates of applications 321-325, update controller 326 transfers a notification to each application at the time each application is allowed to request updates. Upon receiving the notification, each application is triggered to request data updates if necessary. Thus, at time T1, update controller 326 triggers email application 321 and social networking application 322. At time T2, update controller 326 triggers news application 323 and weather application 324. At time T3, update controller 326 triggers calendar application 325.

Figure 7:
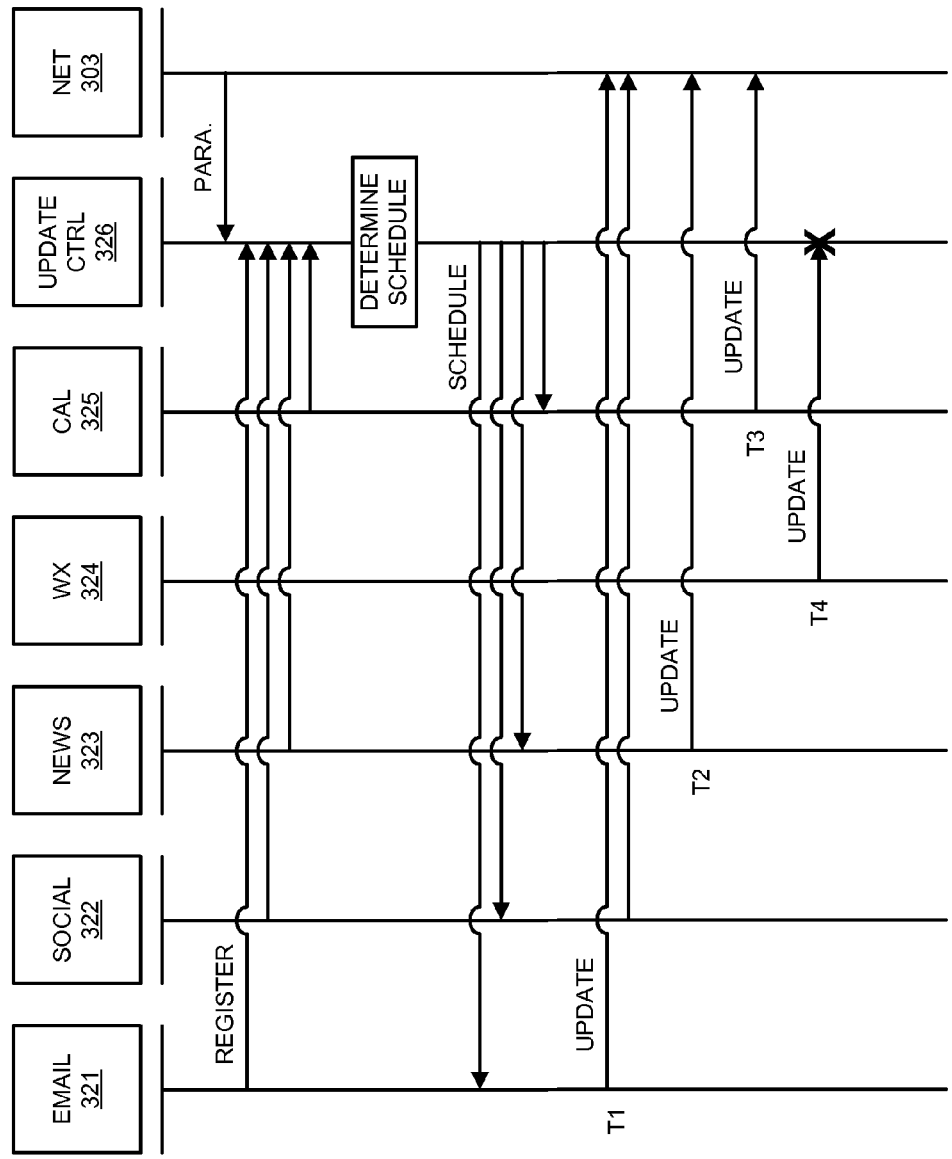
FIG. 7 illustrates an operation of the wireless communication system to orchestrate application updates over a wireless communication network.

FIG. 7 illustrates an operation of wireless communication system 300 to orchestrate application updates over a wireless communication network. In this example, applications 321-323 and 325 register with update controller 326 and update controller 326 determines a data update schedule based in the same manner described above with respect to FIG. 4. Weather application 324 does not register with update controller 326. Weather application 324 may not have registered with update controller 326 because a developer of weather application 324 did not make use of the API for update controller 326 when programming the application. Thus, weather application is incapable of interacting with update controller 326 and is likely unaware of update controller 326's existence.

In this example, update controller transfers an update schedule to each of applications 321-325, although, the individual triggering method of FIG. 6 may also be used. In accordance with the schedule, email application 321 and social networking application 322 request data updates at time T1, news application 323 request data updates at time T2, and calendar application 325 requests data updates at time T3. At some other time T4, weather application 324 attempts to request data updates and update controller 326 rejects that request because weather application 324 is not scheduled to update. Since weather application 324 does not use the API for update controller 326, weather application 324 is unaware that update controller 326 blocked the request and is therefore only aware that the request did not go through. Weather application 324 may continue to request updates and update controller 326 may either block all subsequent update requests or may allow one or more subsequent update requests if the subsequent update requests come at a time that complies with the network constraints. Additionally, update controller 326 may allow update requests for weather application 324 if application 324 is running in the foreground and, thereby, is likely currently being used by a user. Similarly, other applications may be allowed to update outside of the scheduled times when those applications are running in the foreground.

It is therefore advantageous for a developer to take advantage of the API for update controller 326 so that applications are aware of when they are allowed to update. Applications can then prepare for their allowed update times and operate accordingly rather than unknowingly having their update requests blocked by update controller 326.

Figure 8:
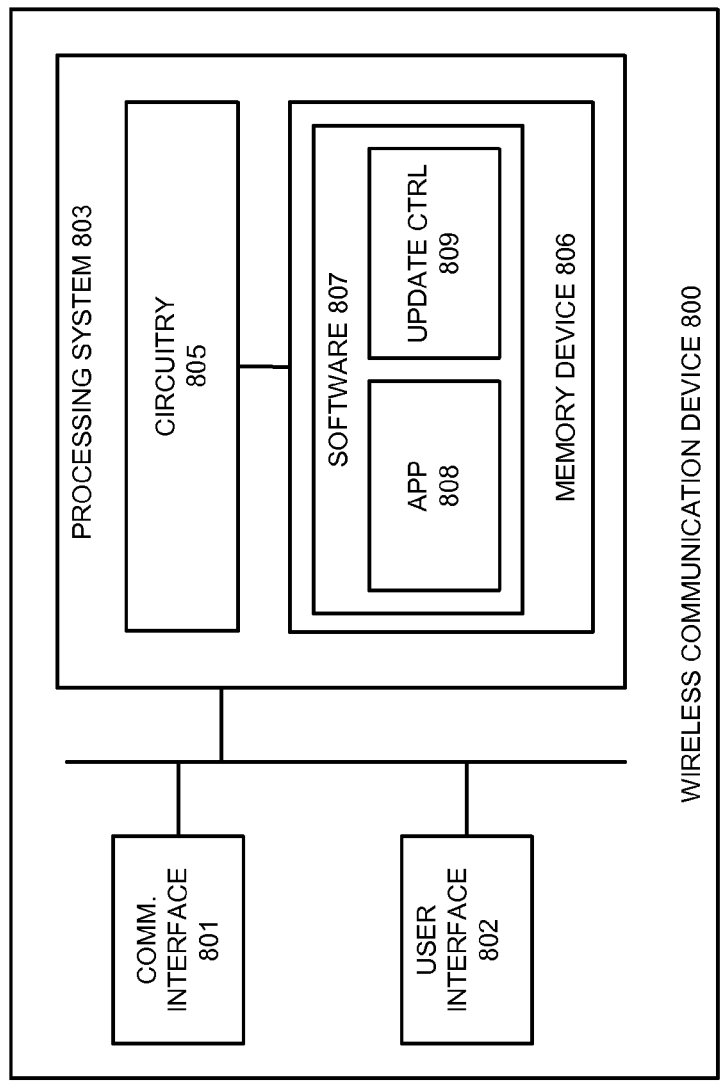
FIG. 8 illustrates a wireless communication device for orchestrating application updates over a wireless communication network.

FIG. 8 illustrates wireless communication device 800. Wireless communication device 800 is an example of wireless communication device 101, although device 101 could use alternative configurations. Wireless communication device 800 comprises wireless communication interface 801, user interface 802, and processing system 803. Processing system 803 is linked to wireless communication interface 801 and user interface 802. Processing system 803 includes processing circuitry 805 and memory device 806 that stores operating software 807. Wireless communication device 800 may include other well-known components such as a battery and enclosure that are not shown for clarity. Wireless communication device 800 may be a telephone, computer, e-book, mobile Internet appliance, media player, game console, wireless network interface card, or some other wireless communication apparatus—including combinations thereof.

Wireless communication interface 801 comprises RF communication circuitry and an antenna. The RF communication circuitry typically includes an amplifier, filter, RF modulator, and signal processing circuitry. Wireless communication interface 801 may also include a memory device, software, processing circuitry, or some other communication device. Wireless communication interface 801 may use various protocols, such as CDMA, EVDO, WIMAX, GSM, LTE, WIFI, HSPA, or some other wireless communication format.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Processing circuitry 805 is typically mounted on a circuit board that may also hold memory device 806 and portions of communication interface 801 and user interface 802. Operating software 807 comprises computer programs, firmware, or some other form of machine-readable processing instructions. Operating software 807 includes first application 808 and update controller 809. Operating software 807 may further include an operating system, utilities, drivers, network interfaces, applications, or some other type of software. When executed by processing circuitry 805, operating software 807 directs processing system 803 to operate wireless communication device 800 as described herein.

In particular, first application 808 directs processing system 803 to register first application 808 with update controller 809. In response to registering the first application, update controller 809 directs processing system 803 to determine first network data update parameters for first application 808 and determine network constraints on application data updates over a wireless communication network. Update controller 809 further directs processing system 803 to determine when the first application is allowed to request data updates based on the first network data update parameters and the network constraints and notify first application 808 of when first application 808 is allowed to request data updates over the wireless communication network.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device, comprising:
   registering a first application with an update controller;
   in response to registering the first application, determining first network data update parameters for the first application and determining network constraints on application data updates over a wireless communication network;
   determining when the first application is allowed to request data updates based on the first network data update parameters and the network constraints; and
   notifying the first application of when the first application is allowed to request data updates over the wireless communication network.

2. The method of claim 1, further comprising:
   registering a second application with the update controller; and
   in response to registering the second application, determining second network data update parameters for the second application, wherein determining when the first application is allowed to request data updates is further based on the second network data update parameters.

3. The method of claim 2, further comprising:
determining when the second application is allowed to request data updates based on the first network data update parameters, the second network data update parameters, and the network constraints; and
notifying the second application of when the second application is allowed to request data updates over the wireless communication network.

4. The method of claim 3, wherein the first application and the second application are notified to request data updates within the same time period.

5. The method of claim 1, wherein notifying the first application comprises:
generating a schedule of when the first application is allowed to request data updates; and
supplying the schedule to the first application.

6. The method of claim 5, wherein the first application requests data updates in accordance with the schedule.

7. The method of claim 1, wherein notifying the first application comprises:
for each individual time the first application is allowed to request data updates, notifying the first application that the first application is allowed to request data updates.

8. The method of claim 7, wherein the first application requests data updates in response to being notified that the first application is allowed to request data updates.

9. The method of claim 1, further comprising:
determining that a second application that is not registered with the update controller is attempting to request data updates over the wireless communication network; and
preventing the second application from accessing the wireless communication network.

10. The method of claim 1, wherein the update scheduler is accessed by the first application using a set of Application Programming Interface (API) calls.

11. A wireless communication device, comprising:
a processing system configured to register a first application with an update controller, in response to registering the first application, determine first network data update parameters for the first application and determining network constraints on application data updates over a wireless communication network, determine when the first application is allowed to request data updates based on the first network data update parameters and the network constraints, and notify the first application of when the first application is allowed to request data updates over the wireless communication network; and
a communication interface configured to transfer a data update request for the first application to the wireless communication network in accordance with the first application being notified that the first application is allowed to request data updates over the wireless communication network.

12. The wireless communication device of claim 11, further comprising:
the processing system configured to register a second application with the update controller and, in response to registering the second application, determine second network data update parameters for the second application; and
wherein the processing system is configured to determine when the first application is allowed to request data updates further based on the second network data update parameters.

13. The wireless communication device of claim 12, further comprising:
the processing system configured to determine when the second application is allowed to request data updates based on the first network data update parameters, the second network data update parameters, and the network constraints and notify the second application of when the second application is allowed to request data updates over the wireless communication network.

14. The wireless communication device of claim 13, wherein the first application and the second application are notified to request data updates within the same time period.

15. The wireless communication device of claim 11, wherein the processing system configured to notify the first application comprises:
the processing system configured to generate a schedule of when the first application is allowed to request data updates and supply the schedule to the first application.

16. The wireless communication device of claim 15, wherein the first application requests data updates in accordance with the schedule.

17. The wireless communication device of claim 11, wherein the processing system configured to notify the first application comprises:
the processing system configured to, for each individual time the first application is allowed to request data updates, notify the first application that the first application is allowed to request data updates.

18. The wireless communication device of claim 17, wherein the first application requests data updates in response to being notified that the first application is allowed to request data updates.

19. The wireless communication device of claim 11, further comprising:
the processing system configured to determine that a second application that is not registered with the update controller is attempting to request data updates over the wireless communication network and prevent the second application from accessing the wireless communication network.

20. The wireless communication device of claim 11, wherein the update scheduler is accessed by the first application using a set of Application Programming Interface (API) calls.

* * * * *